(12) United States Patent
Mozak et al.

(10) Patent No.: US 9,720,471 B2
(45) Date of Patent: Aug. 1, 2017

(54) VOLTAGE REGULATOR WITH FEED-FORWARD AND FEEDBACK CONTROL

(71) Applicants: Christopher P. Mozak, Beaverton, OR (US); Mahmoud Elassal, King City, OR (US)

(72) Inventors: Christopher P. Mozak, Beaverton, OR (US); Mahmoud Elassal, King City, OR (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 14/129,241

(22) PCT Filed: Jun. 28, 2013

(86) PCT No.: PCT/US2013/048669
§ 371 (c)(1),
(2) Date: Dec. 24, 2013

(87) PCT Pub. No.: WO2014/209378
PCT Pub. Date: Dec. 31, 2014

(65) Prior Publication Data
US 2015/0012759 A1 Jan. 8, 2015

(51) Int. Cl.
*G06F 1/26* (2006.01)
(52) U.S. Cl.
CPC .................. *G06F 1/26* (2013.01)
(58) Field of Classification Search
None
See application file for complete search history.

(56) References Cited

U.S. PATENT DOCUMENTS

| 6,989,782 | B2 | 1/2006 | Walker et al. | |
|---|---|---|---|---|
| 7,441,137 | B1* | 10/2008 | Mimberg | G05F 1/462 713/300 |
| 8,929,157 | B2 | 1/2015 | Mozak et al. | |
| 2003/0156635 | A1 | 8/2003 | Fernandez-Corbaton et al. | |
| 2003/0185292 | A1 | 10/2003 | Fernandez-Corbaton et al. | |
| 2005/0015631 | A1* | 1/2005 | McDonald | G06F 1/26 713/300 |
| 2005/0125104 | A1* | 6/2005 | Wilson | H02J 3/06 700/295 |
| 2006/0220625 | A1* | 10/2006 | Chapuis | G05F 1/618 323/282 |

(Continued)

FOREIGN PATENT DOCUMENTS

KR  10-0391879  7/2003

OTHER PUBLICATIONS

PCT International Search Report for PCT/US2013/048669, mailed Apr. 17, 2014, (3 pgs.).

(Continued)

*Primary Examiner* — Paul Yanchus, III
(74) *Attorney, Agent, or Firm* — Blakely, Sokoloff, Taylor & Zafman LLP

(57) ABSTRACT

Described is a voltage regulator with feed-forward and feedback control. Described is an apparatus which comprises: a circuit for providing power or ground supply for a target circuit in response to a control signal; and a feed-forward filter to receive data and to generate the control signal according to the received data.

19 Claims, 5 Drawing Sheets

(56) References Cited

U.S. PATENT DOCUMENTS

| | | | |
|---|---|---|---|
| 2007/0078568 A1* | 4/2007 | Donaldson | H02M 3/156 |
| | | | 700/298 |
| 2008/0062147 A1 | 3/2008 | Hotelling et al. | |
| 2008/0238390 A1 | 10/2008 | Trivedi et al. | |
| 2009/0268340 A1* | 10/2009 | Supino | G11B 5/5582 |
| | | | 360/77.14 |
| 2013/0117582 A1 | 5/2013 | Satyamoorthy et al. | |
| 2014/0089705 A1 | 3/2014 | Man et al. | |
| 2014/0126090 A1 | 5/2014 | Mozak et al. | |
| 2014/0210545 A1* | 7/2014 | Leibowitz | G05F 1/462 |
| | | | 327/540 |
| 2015/0002408 A1 | 1/2015 | Mozak et al. | |

OTHER PUBLICATIONS

PCT International Written Opinion for PCT/US2013/048669, mailed Apr. 17, 2014, (4 pgs.).

Korean Office Action No. 10-2015-703125, related U.S. Application dated Feb. 3, 2017, 8 pages including English summary.

* cited by examiner

VOLTAGE REGULATOR WITH FEED-FORWARD AND FEEDBACK CONTROL

CLAIM OF PRIORITY

This application claims the benefit of priority of International Patent Application No. PCT/US2013/048669 filed Jun. 28, 2013, titled "VOLTAGE REGULATOR WITH FEED-FORWARD AND FEEDBACK CONTROL," which is incorporated by reference in its entirety.

BACKGROUND

Circuit characteristics depend on the power supply levels at which they operate. For example, for an input-output (I/O) transmitter, output signal swing, on-die termination, etc. depends on power supply levels. To compensate for variations in power supply levels, compensation units are used to compensate output signal swing, on-die termination, etc. A full rail-to-rail signal swing consumes power equal to $CV^2F$, where 'C' is the switching capacitance, 'V' is the power supply level, and 'F' is the switching frequency. While, full rail-to-rail signal swing may have benefits of less noise, circuits generating them consume $CV^2F$ power which is a challenge for low power operations because power consumption has a square dependency on power supply level 'V.'

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
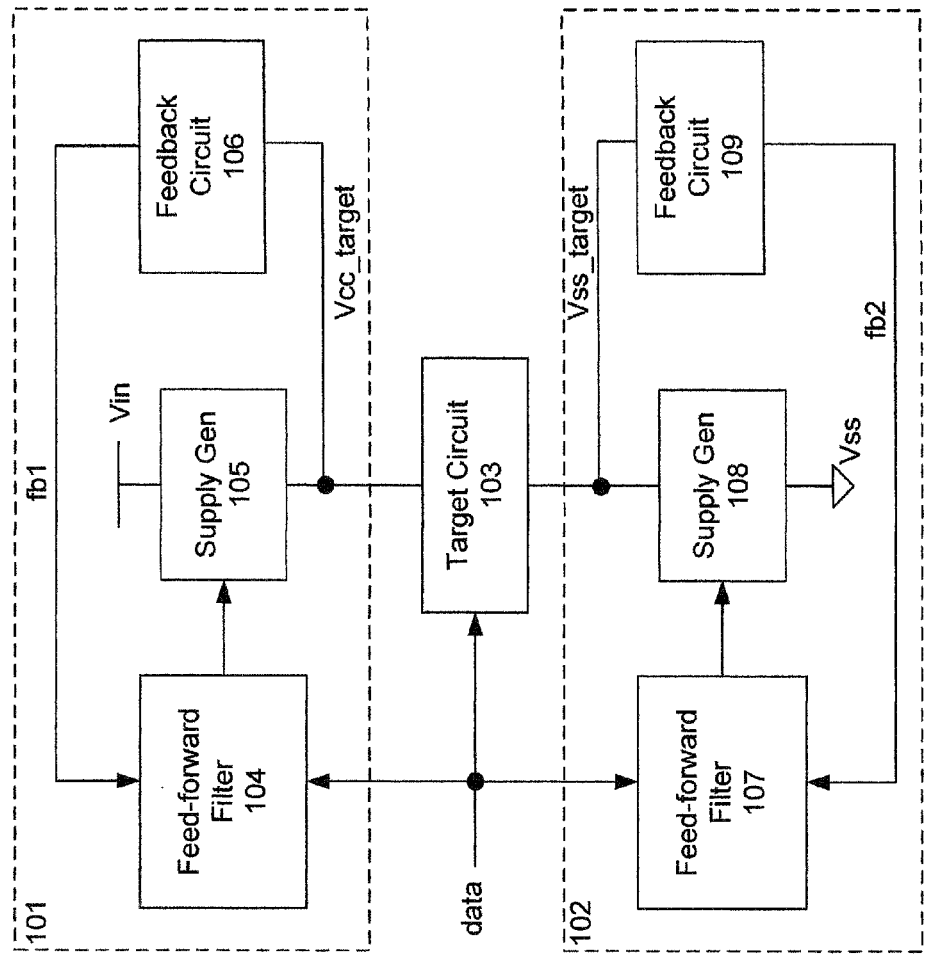
FIG. 1 is a high level architecture of a voltage regulator (VR) having feed-forward and feedback control, according to one embodiment of the disclosure.

The embodiments describe a voltage regulator (VR) that uses a combination of feedback and feed-forward techniques to control the power supply for multiple I/O (input-output) transmitters (or any target circuit) to lower power supply consumption while continuing to allow the I/O transmitter (or the target circuit) to operate within its specifications.

LPDDR4 (Low Power Double Data Rate 4) I/O design is moving towards a low swing Vss (i.e., ground) termination scheme. On the DRAM (Dynamic Random Access Memory) side, the low swing will be created by using an n-type (e.g., NMOS) pull-up and NMOS pull-down, such that the resulting I/O signal swings from 0 to (Vdd-$V_{TN}$) or 0 to ~600 mV, where $V_{TN}$ is threshold voltage of the n-type device. Such a driver structure has many downsides.

For example, the pull-up voltage and Ron (i.e., pull-down termination) value are not well controlled across PVT (process voltage, and temperature) and are difficult to compensate. To compensate for swing, the sub-threshold IV curve is usually less than 100 mV/decade; which means a 100 mV change in $V_{TN}$ (typical number for 100 C temperature change) would require the driver size to change by 10×, creating large pad capacitance and many on-die electromigration issues. Compensating Ron is more complicated than compensating swing because the Ron of interest is a small signal quantity and may require a multi-point measurement procedure. However, once compensated, the non-linear nature of the output resistance (i.e., Ron) may translate to larger reflections and degraded I/O performance in systems with 500 mV swings.

Other issues with the NMOS pull-up driver in a transmitter are that it does not integrate well into the existing CMOS driver used for LPDDR3, making it difficult to create a combo high performance LPDDR3/4 design. For example, it increases pad capacitance and may break the traditional slew rate control schemes.

WIO2 (Wide I/O 2) schemes may exhibit a different set of problems, where the current design swings the pad full rail and consumes a power equal to $CV^2F$. In WIO2, the voltage margin is not very critical but the design may swing the pad full rail for simplicity.

The embodiments describe a VR to lower Vdd to VddTx and/or raise Vss to VssTx, where VddTx is the power supply for the transmitter (or target circuit) and VssTx is the ground level for the transmitter (or the target circuit). In one embodiment, the adjustment of Vdd to VddTx and/or Vss to VssTx is done in a symmetrical fashion and preserves the common mode of Vdd/2 for the DRAM receiver. In such an embodiment, for the LPDDR4 case, this would significantly lower power while providing flexibility to target specific voltage swings across PVT.

The embodiments describe a VR that has low power and cost overhead while maintaining tight control of the transmitter (or target circuit) supply voltage. In one embodiment, the VR is integrated on-die to reduce the cost associated with power delivery at the package/board level (e.g., additional package/board layers, additional board real estate, passive elements are avoided). The embodiment of the VR operates with low on die capacitance compared to traditional voltage regulators that require a large load capacitor.

The embodiments describe a VR which is used to lower swing of a driver (of a transmitter, the target circuit) to just what the DRAM requires to correctly sample the signal. For example, power and ground supply levels are dynamically adjusted by the VR of the embodiments so that the transmitter driver generates a signal which swings at the pad node from 0.2*Vdd to 0.8*Vdd, instead of 0 to Vdd. In such an embodiment, the resulting power consumption reduces (e.g., by 40%) and continues to meet the JEDEC (Joint Electron Devices Engineering Council) specification requirements.

In one embodiment, VR provides an amount of current to the power supply of a target circuit which is equivalent to the amount of current being used to perform a certain function by the target circuit. For example, if the target circuit is sending a signal out to a receiver and the signal must have a certain signal swing for the receiver to sample the signal, then the VR analyzes the data to be transmitted by the target circuit and provides enough current to the power supply of the target circuit so that it can generate a signal that has enough swing to be sampled properly by the receiver. The embodiments are not limited to the example of signal swing management to reduce power of the transmitter, but can be used for any target circuit for which data to be used by the target circuit is known.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 is a high level architecture 100 of a VR having feed-forward and feedback control, according to one embodiment of the disclosure. In one embodiment, architecture 100 comprises a first VR 101 to provide Vcc_target, a second VR 102 to provide Vss_target, and target circuit 103.

In one embodiment, first VR 101 comprises a feed-forward filter 104, supply generator (Gen) 105, and feedback circuit 106. In one embodiment, first VR 101 analyzes data (i.e., input data to be used by target circuit 103) and determines the current that will be consumed by the target circuit 103 based on the new and prior history of the data signal. For example, a simple digital circuit will consume a fixed amount of current from Vcc_target for every rising edge. An analog circuit may consume a constant current from Vcc_target whenever the enable is high. In some embodiments, current demands by target circuit 103 can be modeled as a finite impulse response with long histories.

In one embodiment, supply generator 105 comprises p-type devices coupled to input power supply Vin and output power supply Vcc_target, and are controllable by output of feed-forward filter 104. In one embodiment, feedback circuit 106 monitors Vcc_target and generates fb1 signal (e.g., instructions or signals to adjust filter coefficients of feed-forward filter 104) for feed-forward filter 104.

In one embodiment, second VR 102 is similar to first VR 101 except that it is used to regulate and/or adjust Vss_target for target circuit 103 i.e., ground supply for target circuit 103. In one embodiment, second VR 102 comprises a feed-forward filter 107, supply generator (Gen) 108, and feedback circuit 109. In one embodiment, second VR 102 analyzes data (i.e., input data to be used by target circuit 103) and determines the current demand by the target circuit 103 based on the new and prior history of the data signal. In one embodiment, supply generator 108 comprises n-type devices coupled to ground supply Vss and output ground supply Vss_target, and are controllable by output of feed-forward filter 109. In one embodiment, feedback circuit 109 monitors Vss_target and generates fb2 signal (e.g., instructions or signals to adjust filter coefficients of feed-forward filter 107) for feed-forward filter 107.

In one embodiment, target circuit 103 is a transmitter of an I/O. In one embodiment, target circuit 103 is a receiver of an I/O. In other embodiments, target circuit 103 can be any circuit that can operate with adjustable Vcc_target and/or Vss_target using data to be received by target circuit 103. In one embodiment, both regulators 101 and 102 are coupled to target circuit 103. In other embodiments, only one of them is coupled to target circuit 103.

The following embodiments explain the details of VR 101 with reference to a target circuit 103 which is a transmitter. However, the same explanation can be tailored for any target circuit for which data to be processed is known in advance of processing by the target circuit. The term "data" here is somewhat generic. In the case of an I/O transmitter, data means the actual transmitter output on a per lane basis. In other applications, data may represent multiple signals that can be used in collectively to estimate current demand. These signals may be digital indications of high level actions such as Enable, Fetch, Issue, Read, Write, Idle, PowerDown, etc.

Figure 2:
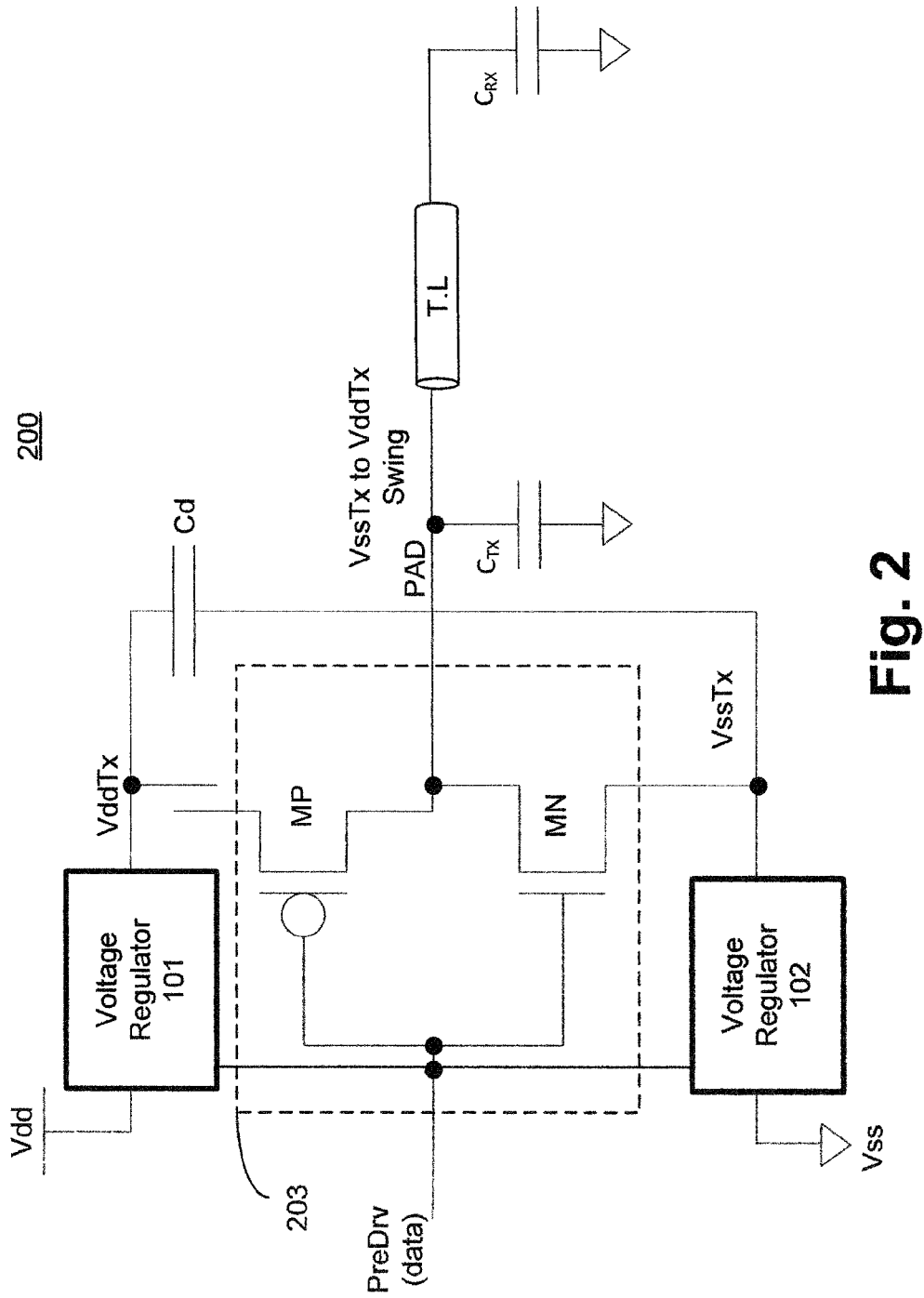
FIG. 2 is a circuit with an input-output (I/O) driver and the VR having feed-forward and feedback control, according to one embodiment of the disclosure.

FIG. 2 is a circuit 200 including an I/O driver with the VR having feed-forward and feedback control, according to one embodiment of the disclosure. It is pointed out that those elements of FIG. 2 having the same reference numbers (or names) as the elements of any other figure can operate or function in any manner similar to that described, but are not limited to such.

In one embodiment, circuit 200 comprises first and second VRs 101 and 102, target circuit 203, pad coupled to output of target circuit 203, decoupling capacitor Cd coupled to VddTx and VssTx; and parasitic capacitance for modeling pad capacitor $C_{TX}$, and input capacitance $C_{RX}$ of receiver (not shown), where T.L is the transmission line model coupling the receiver to the transmitter (target circuit 203).

In this embodiment, first VR 101 and second VR 102 are used to adjust Vdd and Vss supplies. For example, VR 101 is used to lower Vdd to VddTx, and VR 102 is used to raise Vss to VssTx. In one embodiment, adjustment to VddTx and VssTx is performed in a symmetrical fashion such that common mode of Vdd/2 is preserved for the receiver (not shown).

In this embodiment, target circuit is driver 203 which comprises pull-up device(s) MP and pull-down device(s) MN. In one embodiment, pre-driver data (PreDrv) is received by first and second VRs 101 and 102 which analyze it and adjust the current sourced/sinked into the VddTx/VssTx nodes based on the expected current demand by target circuit 203 such that driver 203 continues to operate properly (i.e., with within specification voltage swing, on-die termination, and/or other performance parameters, etc.) while reducing power consumption. In this embodiment, unlike a traditional feedback approach which waits for an error to appear and then tries to correct it, this regulator uses a feed-forward based approach that pre-calculates the estimated current every cycle and applies exactly that much current every cycle. Due to this proactive approach, the regulator of this embodiment tends to provide a much better dynamic response (than traditional regulators) that translates to either lower caps or lower supply noise.

Figure 3:
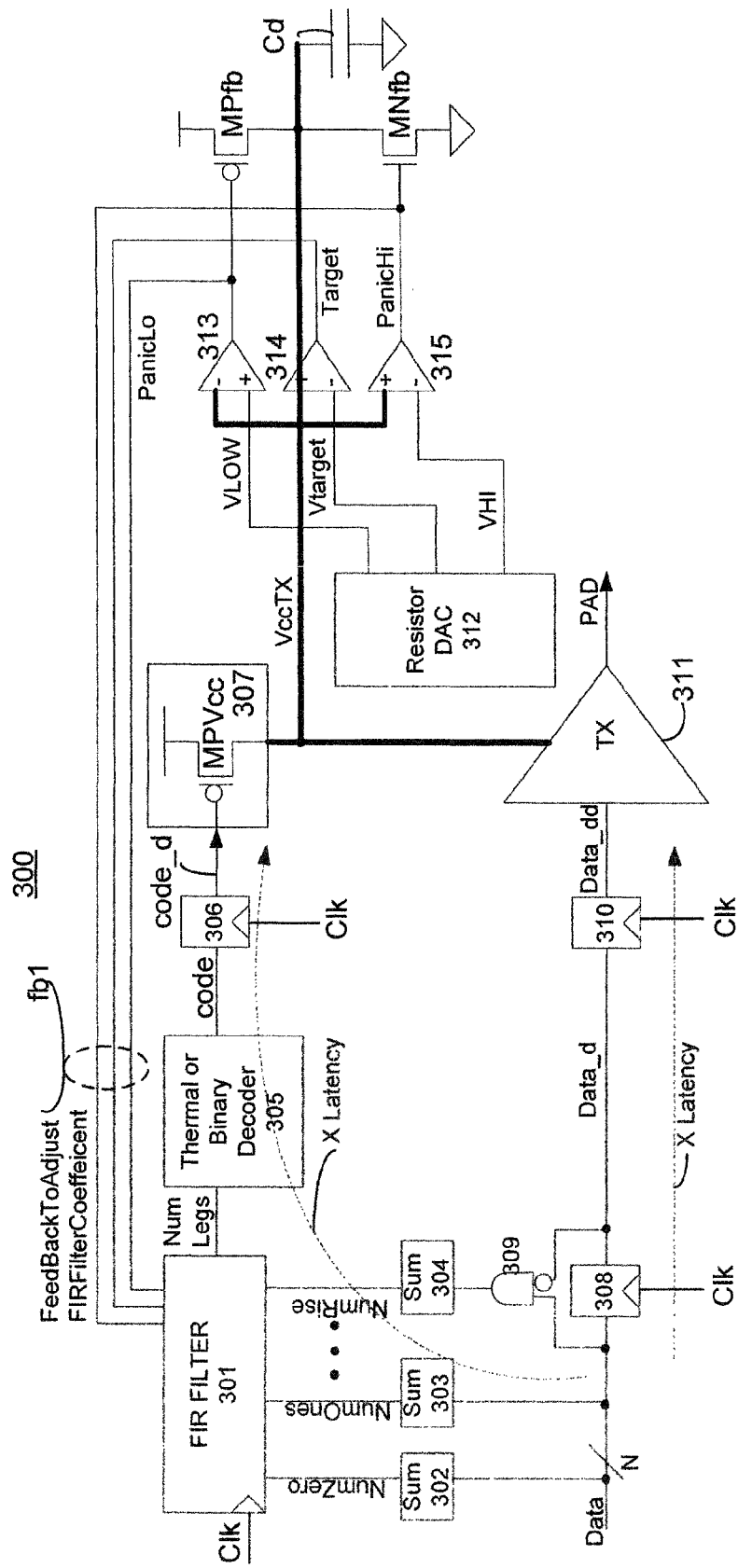
FIG. 3 is an implementation of the VR having feed-forward and feedback control used for an I/O transmitter, according to one embodiment of the disclosure.

FIG. 3 is a circuit 300 of a VR having feed-forward and feedback control used for an I/O transmitter, according to one embodiment of the disclosure. It is pointed out that those elements of FIG. 3 having the same reference numbers (or names) as the elements of any other figure can operate or function in any manner similar to that described, but are not limited to such. So as not to obscure the embodiment, the embodiment of FIG. 3 shows implementation of first VR 101. Similar implementation can be made for second VR 101.

In one embodiment, circuit 300 comprises FIR (finite impulse response) filter 301, summers 302, 303, and 304, thermal or binary decoder 305, sampler 306, supply generator 307, sampler 308, logic gate 309, sampler 310, transmitter 311, resistor DAC (digital-to-analog converter) 312, comparators 313, 314, and 315, p-type device MPfb, n-type device MNfb, and decoupling capacitor Cd. In this embodiment, FIR filter 301, summers 302-304, thermal or binary decoder 305, and sampler 306 form feed-forward filter 104. In this embodiment, supply generator 307 is same as 105. In this embodiment, resistor DAC 312, comparators 313-315, MPfb, and MNfb form feedback circuit 106.

In one embodiment, the main driver of the regulator is PMOS pull-up device MPVcc 307, where the number of PMOS device legs is dynamically adjusted to supply the required load current demand and maintain a fixed VccTX voltage. In one embodiment, MPVcc devices are operated in a digital fashion, where a given leg of MPVcc is either enabled or disabled via code_d signal. In other embodiments, the transistors may be operated in a more analog fashion where bias voltage is dynamically modulated based on load current demand. In the analog implementation (not shown), the FIR filter multiplication and addition may also be implemented in the analog domain as well. Here, the term "leg" generally refers to one or more transistors of MPVcc which are coupled in parallel to other one or more transistors of MPVcc. In one embodiment, code_d is generated by sampler 306 which samples output code from decoder 305.

In one embodiment, the number of legs of MPVcc that are enabled at any given time is determined by FIR filter 301. In one embodiment, FIR filter 301 looks at how many I/O lanes are driving high, how many lanes are driving low, how many lanes are toggling and possibly other conditions (rising edges, falling edges, temp, voltage, etc.) to decide how many legs of MPVcc should be enabled (i.e., turned on). For embodiments where the channel has a longer impulse response, a full N-tap deep FIR filter is used to adjust the current demand of the target circuit based on the channel ISI (inter symbol interference).

Equation 1 illustrates the mathematical representation of FIR filter 301.

$$\Sigma_{k=0}^{n}\alpha_{k}*NumZeros*z^{-k}+\Sigma_{k=0}^{n}\beta_{k}*NumOnes*z^{-k}+\Sigma_{k=0}^{n}\gamma_{k}*NumToggles*z^{-k} \quad (1)$$

The filter coefficients ($\alpha_k$, $\beta_k$, $\gamma_k$) represent how much current a given operation consumes. For example: $\alpha_0$ indicates current consumed in the current cycle by one lane driving a 0 (i.e., logical low); $\beta_0$ indicates current consumed in the current cycle by one lane driving a 1 (i.e., logical high); $\gamma_0$ indicates current consumed in the current cycle by one lane rising in the current cycle; and $\gamma_1$ indicates current consumed in the current cycle by one lane rising edge in the previous cycle. Here, rising refers that the previous cycle was 0 and current cycle is 1. For a circuit driving a lumped cap that fully switches with 1 period, $\gamma_0 = CV^2F$. The embodiments are not limited to equation (1). In some embodiments, other equations representing FIR filter 301 may be used.

In one embodiment, summer (Sum) 302 sums the number of zeros (i.e., logical lows) on data and generates an output NumZero which is used by FIR filter 301 as expressed in equation (1). In one embodiment, summer 303 sums the number of ones (i.e., logical highs) on data and generates an output NumOnes which is used by FIR filter 301 as expressed in equation (1). In one embodiment, summer 304 sums the number of rising transitions on data and generates an output NumRise which is used by FIR filter 301 as expressed in equation (1).

It is understood that there are numerous ways to implement the feed-forward equations and how to translate those equations into hardware. The embodiments use real datapath signals such as {Data, Data_d, Data_dd} and processes those signals using FIR or IIR (infinite impulse response) filters to estimate the current demand.

In such an embodiment, data and its previous value (i.e., output of sampler 308) is ANDed by logic 309. In this embodiment, output Data_d of sampler 308 is inverted before it is ANDed by logic 309. In one embodiment, output of AND logic is used by summer 304 to generate NumRise for FIR filter 301. In one embodiment, fewer or more summers may be used to generate data for FIR filter 301. In one embodiment, Data_d is sampled again by sampler 310 to generate Data_dd which received as input by transmitter (Tx) 311.

In one embodiment, with a sufficient number of coefficients, the number of legs of MPVcc which are turned on to maintain the target voltage VccTx can be calculated. In one embodiment, determining the number of legs of MPVcc is performed using digital logic with low precision fixed point math, which consumes little power. In this example, the major source of power consumption is the dynamic power consumed by the turning on/off of MPVcc legs. In one embodiment, this power can be controlled by optimizing the coefficients of FIR filter 301 to reduce toggling or using a thermal decoder (e.g., 305) to reduce the number of legs switching.

In one embodiment, a thermal decoder (e.g., 305) translates an N-bit number into $2^N-1$ bits with the property of {if bit[i]=1, then bit[j]==1 for all (j<i)}. For example, a 2 bit thermal decoder produces: {0: 000, 1: 001, 2: 011, 3: 111}. In one embodiment, a combination of binary and thermal control is used to better optimize decoder/wire overhead vs. switching power. For example, decoding 8 bits using 4 bit thermal decoder and 4 bit binary decoder may use 15+4=19 wires instead of 256 wires.

The embodiment of FIG. 3 shows the data being available early such that the latency (e.g., Latency X) to calculate the number of turned-on MPVcc legs substantially matches the latency on the data reaching transmitter 311. In such an embodiment, noise on VccTx is reduced. However, in many applications, performance or specifications may not allow for data to be delayed to achieve this. This regulator can still be used in these cases but may use more decoupling capacitance or faster FIR filter calculations. In one embodiment, this regulator may be used in an I/O receiver where the digital value of the data is only known after the data if fully amplified and sampled.

In one embodiment, the extra latency in the feed-forward regulator path (i.e., summers 302/303/304→FIR filter 301→thermal or binary decoder 305→sampler 306) may delay when the regulator sets the proper number of legs, which may translate into either having more supply noise or requiring more capacitance. Here, the term "extra" refers to latency in the feed-forward path that is not present in the normal I/O transmitter data path. In this embodiment, the matched latency design uses almost no voltage supply filtering capacitance.

In one embodiment, to determine coefficients for FIR filter 301, a feedback loop (using fb1) is used. In one embodiment, the feedback circuit senses voltage on VccTx and provides feedback fb1 to FIR filter 301 to adjust the different coefficients. In one embodiment, feedback signal(s) fb1 is a sign only or a combination or sign and magnitude of the error.

In one embodiment, initial coefficients are determined with the following sequence of data patterns: drive all 0s (i.e., logical lows) on data, and adjust $\alpha_0$ with a digital FSM (finite state machine, which is not shown) until VccTx reaches the target value; drive all 1s (i.e., logical highs) on data, and adjust $\beta_0$ with digital FSM until VccTx reaches the target value; drive pattern "1010" on data, and adjust $\gamma_0$ with digital FSM until VccTx reaches the target value; and drive pattern "1100" on data, and adjust $\gamma_1$ with digital FSM until VccTx reaches the target value.

In one embodiment, the training sequence is executed in such a way that the digital FSM determines one coefficient at a time. For example, driving pattern "1010" on data requires the coefficients {$\alpha_0$, $\beta_0$, $\gamma_0$}, but the previous steps already figured out {$\alpha_0$, $\beta_0$}. In such an embodiment, complexity and cost are greatly simplified. In another embodiment, the loop determines multiple coefficients simultaneously using well known search approaches such as least mean squares (LMS) or steepest decent (SD). In one embodiment, FSM monitors the error response, filters the response, and updates the coefficients accordingly. In one embodiment, the different coefficients have very difficult magnitudes. For example, driving 0 on data causes leakage current vs. driving 1 on data causes pull against an active termination. In such an embodiment, a different amount of filtering may be used to achieve stability. For example, bandwidth of FIR filter 301 is varied based on the coefficient or the magnitude of the coefficient. In one embodiment, the training of initial coefficients may be done using an combination of hardware, firmware or software as determined by the constraints of the system.

In one embodiment, after determining the initial coefficients, the coefficients are updated at low frequencies (e.g., less than 50 MHz) since temperature is the main effect that would impact the coefficients. In one embodiment, for temperature drift, low frequency is around 1 kHz despite the I/O link operating at 1 GHz. In one embodiment, coefficients are updated using the existing random data pattern that naturally occurs on the data bus and then determining which coefficients should be changed. For example, if the data has a high toggle rate, most of the error may be due to $\gamma_0$ and so only adjust $\gamma_0$ coefficient is updated. In one embodiment, well known search techniques such are least mean squares or steepest decent can be used to dynamically adjust the coefficients based on the existing data.

In one embodiment, all coefficients for FIR filter 301 are simultaneously updated. In one embodiment, a shorter version of the initial training flow is rerun to update one or more coefficients. For example, within the DDR (double data rate) protocol, coefficients are updated in background during refresh (e.g., ZQCal or CKE power down) without impacting bus bandwidth. During this time, a memory controller drives NOP commands/data that are ignored by the DRAM but may allow the memory controller to update it's VccTx regulator.

In some cases, the feed-forward regulator may not be able to provide sufficient resolution in either the regulator's driver MPVcc or fixed point math (computed by summers 302-304 and FIR filter 301). In other cases, the drift from temperature or other effects in the feed-forward logic may not be corrected. This can lead to an error that accumulates over time and may lead to a significant error in the resulting VccTX voltage. In one embodiment, feedback based panic drivers are used to correct the above problem. In one embodiment, PanicHi comparator 315 is used to check if VccTX is well above the target voltage (e.g.: VHi) and causes VccTx to yank down. In one embodiment, PanicLo comparator 313 is used to check if VccTx is well below the target voltage (e.g., VLow) and causes VccTx to yank up. In one embodiment, VHi is 25 mV above Vtarget, and VLow is −25 mv below Vtarget. In other embodiments, other thresholds for VHi and VLow may be used. In one embodiment, comparators 313, 314, and 315 are non-linear comparators. In other embodiments, a more traditional feedback loop that looks at the error signal (VccTx-Vtarget) and applies a filtered version of the error to adjust the drive current can be used.

In one embodiment, VHi, VLow, and Vtarget are generated by a reference generator. In one embodiment, the reference generator is a resistor DAC 312. In one embodiment, the reference generator is a bandgap reference generator. In other embodiments, other reference generators may be used to generate VHi, VLow, and Vtarget.

In one embodiment, panic driver (or feedback driver) comprises NMOS (i.e., MNfb) or PMOS (i.e., MPfb) devices. In one embodiment, panic driver comprises a compensated current source or resistor to control how much panic will move VccTX. One advantage of the panic driver (or any feedback loop with hysteresis) is that it tends not to fight with the main PMOS driver MPVcc and achieves high bandwidth with a low power cost. In one embodiment, a feedback loop with hysteresis or some dead zone around the target code may be used to ensure stability of the loop in the dead band by having low gain in this region. For example, feedback loop with hysteresis is used to provide high bandwidth without impacting the loop stability. In one embodiment, the pull-up portion of the feedback loop driver is integrated into the main PMOS driver MPVcc.

One advantage of the regulator of 300 is that it provides low noise with little VccTX capacitance, making it a great candidate to integrate on die. One reason for the above advantage is that the embodiment uses feed-forward approach where it pre-calculates precisely what current is required as opposed to waiting for an error to appear in the feedback loop. The embodiment of FIG. 3 has very low overhead current because the use of analog logic/circuit is reduced and any constant bias current in the output driver is eliminated. In this embodiment, digital switching power is reduced by using a thermal decoder. Another advantage of the embodiment of FIG. 3 is that being largely a digital approach, it allows to be scaled easily across process generations.

While the embodiment of FIG. 3 illustrates voltage regulation of VccTx using feed-forward and feedback control, the same technique can be used for voltage regulation of VssTx using feed-forward and feedback control. In one embodiment, only apparatus for voltage regulation of VccTx using feed-forward and feedback control is used for a target circuit. In one embodiment, only apparatus for voltage regulation of VssTx using feed-forward and feedback control is used for a target circuit. In one embodiment, both VssTx and VccTx are regulated with their respective voltage regulators with feed-forward and feedback control.

While the embodiment of FIG. 3 illustrates adjustment of VccTx for transmitter Tx 311 so that voltage swing at the pad is adjusted, using data to be transmitted, to a swing level which can be received properly by a receiver with lower power supply level for VccTx than Vcc (or Vin), the embodiments are not limited to transmitter Tx and for just monitoring voltage swing using priori data. In one embodiment, voltage regulation with feed-forward and feedback control can be used to reduce power consumption for any logic for which data information is available that can be used to calculate the current demand with reasonable accuracy (e.g. within 20%). In one embodiment, exact accuracy is not required as any residual error can be handled using a feedback loop. For example, voltage regulation with feed-forward and feedback control can be used in a receiver to calculate on-die termination needed for successful reception of a signal while lowering power consumption.

Figure 4:
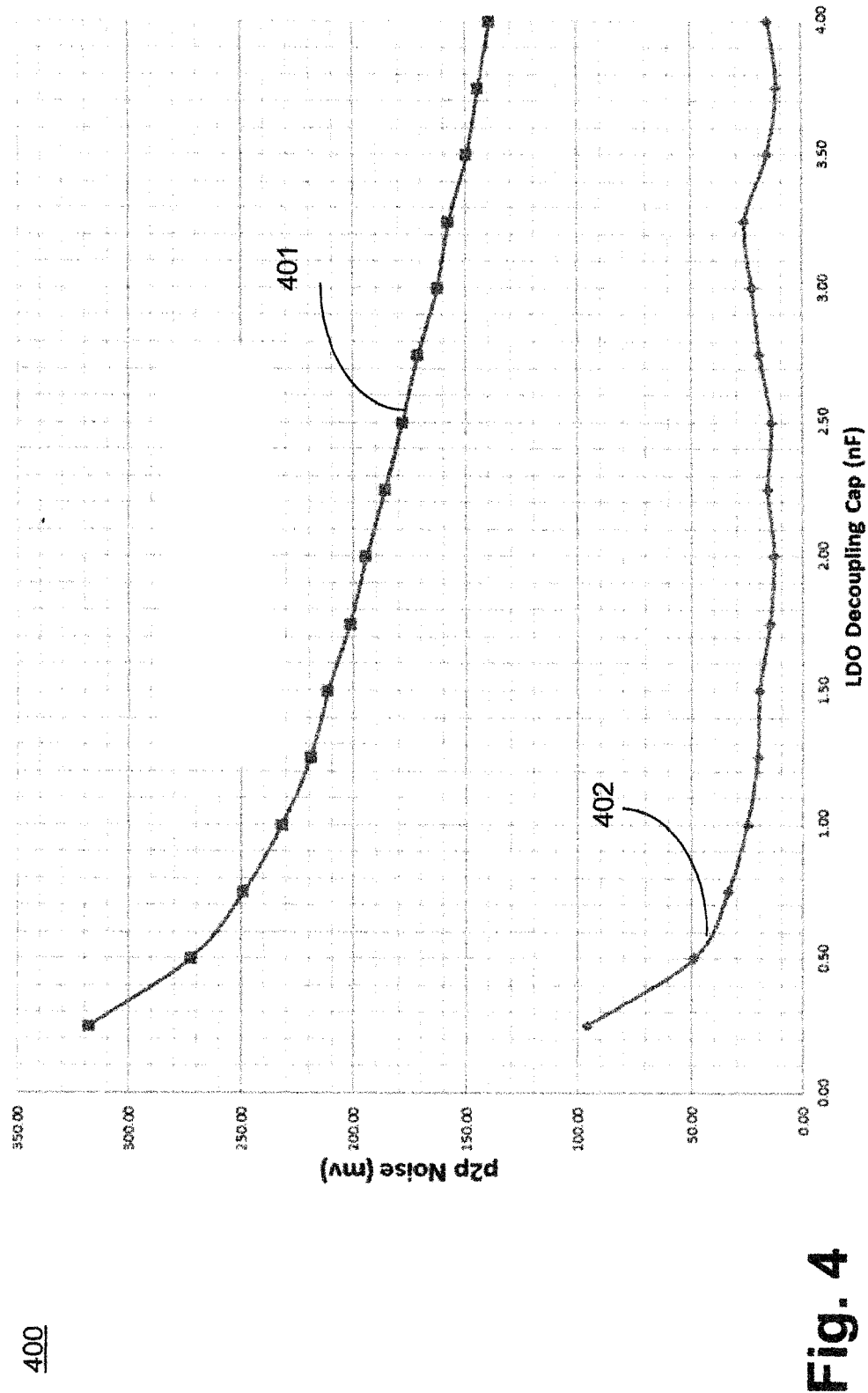
FIG. 4 is a plot of supply noise as a function of capacitance which compares the VR having feed-forward and feedback control (e.g., as shown in FIG. 3) with a traditional feedback based VR, according to one embodiment.

FIG. 4 is a plot 400 of supply noise as a function of capacitance which compares voltage regulator having feed-forward and feedback control (e.g., as shown in FIG. 3) with a traditional feedback based VR, according to one embodiment. In this example, random data with a burst-idle-burst type pattern is used. The traditional feedback VR uses a bandwidth of 100 MHz, which is realistic for the environment and target power consumption. As shown by waveform 401, feedback regulator has 4× higher peak2peak noise levels than a feed-forward design (shown as waveform 402) with the same amount of capacitance.

Figure 5:
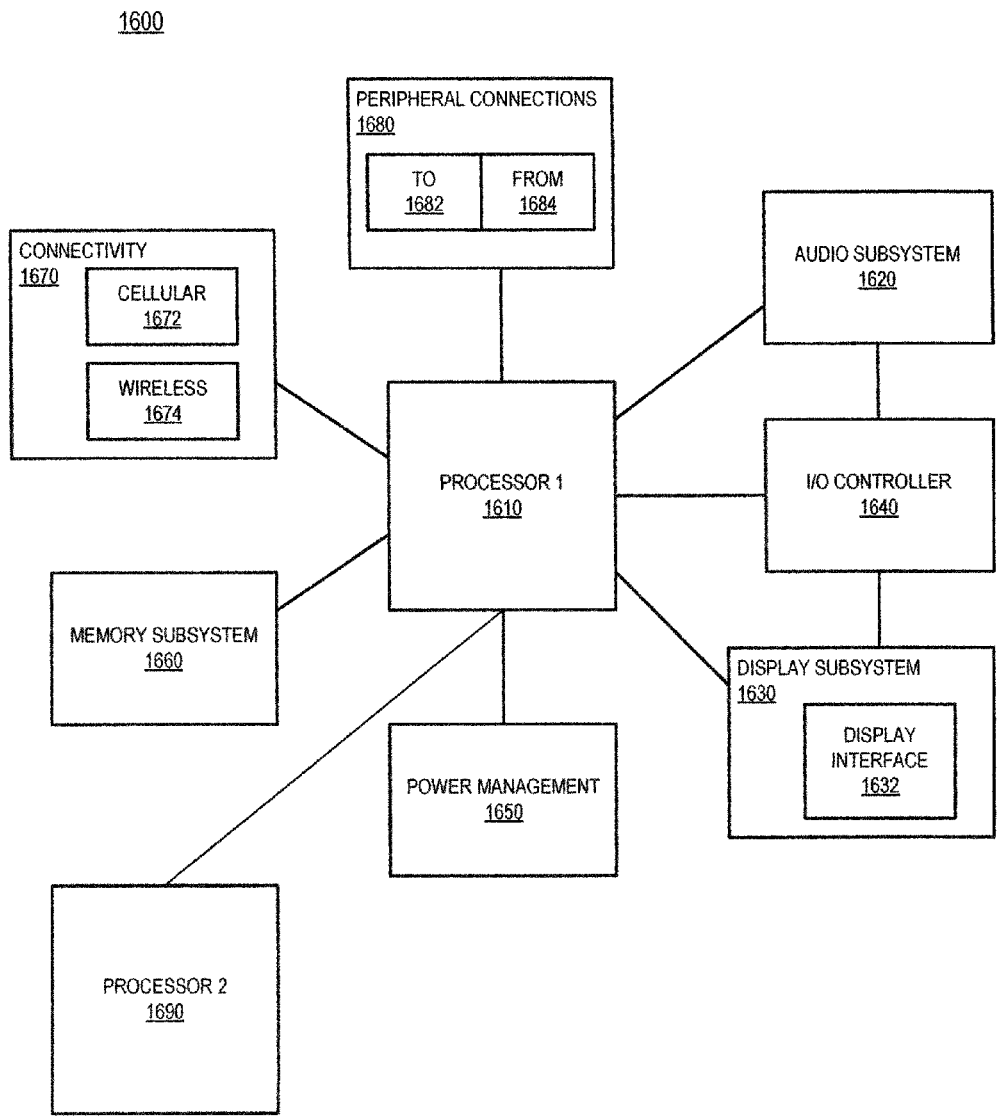
FIG. 5 is a smart device or a computer system or an SoC (system-on-chip) with the VR having feed-forward and feedback control, according to one embodiment of the disclosure.

FIG. 5 is a smart device or a computer system or an SoC (system-on-chip) with a VR having feed-forward and feedback control, according to one embodiment of the disclosure. It is pointed out that those elements of FIG. 5 having the same reference numbers (or names) as the elements of any other figure can operate or function in any manner similar to that described, but are not limited to such.

FIG. 5 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with a VR having feed-forward and feedback control described with reference to embodiments of FIGS. 1-3, according to the embodiments discussed. Other blocks of the computing device 1600 may also include a VR having feed-forward and feedback control described with reference to embodiments of FIGS. 1-3. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, an apparatus comprises: a circuit for providing power or ground supply for a target circuit in response to a control signal; and a feed-forward filter to receive data and to generate the control signal according to the received data. In one embodiment, the apparatus further comprises a feedback circuit to receive the power or ground supply as input and for adjusting filter coefficients of the feed-forward filter according to a voltage level of the power or ground supply. In one embodiment, the feedback circuit comprises: a reference generator; and a plurality of comparators each of which receives the power or ground supply as input and a corresponding reference voltage from the reference generator.

In one embodiment, the feed-forward filter is a Finite Impulse Repose (FIR) filter. In one embodiment, the apparatus further comprises: a decoder to convert output of the feed-forward filter to a decoded output; and a sampler to sample the decoded output to generate the control signal. In one embodiment, the feed-forward filter, decoder, and sampler have a propagation delay which is substantially equal to a propagation delay from a physical point where data is received by the feed-forward filter and provided as input to the target circuit.

In one embodiment, the target circuit is at least one of: a transmitter coupled to a pad; or a receiver coupled to a pad. In one embodiment, the circuit for providing the power supply comprises p-type transistors controllable by the control signal, the p-type transistors to receive an input power supply at one of their terminals and to provide the power supply to the target circuit at another of their terminals. In one embodiment, the circuit for providing ground supply comprises n-type transistors controllable by the control signal, the n-type transistors to receive another ground supply at one of their terminals and to provide the ground supply to the target circuit at another of their terminals, wherein voltage level of the ground supply to the target circuit is closer to the other ground supply than to the power supply.

In another example, in one embodiment, an apparatus comprises: p-type transistors for providing power supply for a transmitter in response to a first control signal; one or more summers to receive input data and generating output indicative of a number of logical zeros, logical ones, and toggling data in the input data; and a finite impulse response (FIR) filter coupled to the one or more summers, the FIR filter for generating the first control signal according to the output of the one or more summers.

In one embodiment, the apparatus further comprises a decoder coupled to the FIR filter, the decoder for decoding output of the FIR for generating the first control signal. In one embodiment, the decoder is one of a thermometer decoder or a binary decoder. In one embodiment, the apparatus further comprises one or more samplers for sampling output of the decoder for generating the first control signal. In one embodiment, the apparatus further comprises a feedback circuit to receive the power supply as input and for adjusting filter coefficients of the FIR filter according to a voltage level of the power supply.

In one embodiment, the feedback circuit comprises: a reference generator; and a plurality of comparators each of which receives the power supply as input and a corresponding reference voltage from the reference generator. In one embodiment, the apparatus further comprises: n-type transistors for providing ground supply for the transmitter in response to a second control signal; one or more summers to receive input data and generating output indicative of a number of logical zeros, logical ones, and toggling data in the input data; and a finite impulse response (FIR) filter coupled to the one or more summers, the FIR filter for generating the second control signal according to the output of the one or more summers.

In one embodiment, the apparatus further comprises a decoder coupled to the FIR filter, the decoder for decoding output of the FIR for generating the second control signal. In one embodiment, the decoder is one of a thermometer decoder or a binary decoder. In one embodiment, the apparatus further comprises: one or more samplers for sampling output of the decoder for generating the second control signal. In one embodiment, the apparatus further comprises a feedback circuit to receive the ground supply as input and for adjusting filter coefficients of the FIR filter according to a voltage level of the ground supply. In one embodiment, the feedback circuit comprises: a reference generator; and a plurality of comparators each of which receives the ground supply as input and a corresponding reference voltage from the reference generator.

In another example, in one embodiment, a system comprises: a memory unit; a processor coupled to the memory unit, the processor including an apparatus according to the embodiments described; and a wireless interface for allowing the processor to communicate with another device. In one embodiment, the system further comprises a display unit for displaying content processed by the processor. In one embodiment, the display unit is a touch screen.

In another example, a method comprises: initially training filter coefficients using a combination of hardware and software; and training the filter coefficients during system operation using search algorithms. In one embodiment, the search algorithm includes at least one of: least mean square, or steepest descent.

In another example, in one embodiment, an apparatus comprises: a feedback circuit including: a reference generator; and a plurality of comparators each of which receives power or ground supply as input and a corresponding reference voltage from the reference generator; and a feed-forward circuit coupled to the feedback circuit, wherein output of at least one comparator from the plurality of comparators is used to adjust coefficients of the feed-forward circuit.

In one embodiment, the feedback circuit includes a hysteresis circuit. In one embodiment, the feed-forward filter is one of: a Finite Impulse Response (FIR) filter; or an Infinite Impulse Response (IIR) filter. In one embodiment, the feedback circuit to receive the power or ground supply as input and for adjusting filter coefficients of the feed-forward filter according to a voltage level of the power or ground supply.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a circuit to provide a power or a ground supply for a target circuit in response to a control signal, the target circuit having a first input to receive I/O data; and
   a feed-forward filter having a second input coupled to the first input, the second input to receive the I/O data, the feed-forward filter to generate the control signal according to the received data, the feed-forward filter to generate the control signal as a function of a number of 1 s factored by a first coefficient, a number of 0s factored by a second coefficient and a number of transitions of the I/O data factored by a third coefficient.

2. The apparatus of claim 1, wherein the feed-forward filter is to generate the control signal based on one or more data signals that predict current demand by the target circuit.

3. The apparatus of claim 1 further comprising a feedback circuit to receive the power or ground supply as an input and to adjust filter coefficients of the feed-forward filter according to a voltage level of the power or ground supply.

4. The apparatus of claim 3, wherein the feedback circuit comprises:
   a reference generator; and
   a plurality of comparators each of which are to receive the power or ground supply as an input and a corresponding reference voltage from the reference generator.

5. The apparatus of claim 1, wherein the feed-forward filter is one of:
   a Finite Impulse Response (FIR) filter;
   an Infinite Impulse Response (IIR) filter.

6. The apparatus of claim 1 further comprising:
   a decoder to convert a first output of the feed-forward filter to a decoded output; and
   a sampler to sample the decoded output to generate the control signal.

7. The apparatus of claim 6, wherein the feed-forward filter, decoder, and sampler have a propagation delay which is substantially equal to a propagation delay from a physical point where data is received by the feed-forward filter and provided as input to the target circuit.

8. The apparatus of claim 1, wherein the target circuit is at least one of:
   a transmitter coupled to a pad;
   a receiver coupled to a pad.

9. The apparatus of claim 1, wherein the circuit to provide a power or a ground supply is a circuit to provide a power supply, the circuit further comprising transistors controllable by the control signal, the transistors to receive an input power supply at one of their terminals and to provide the power supply to the target circuit at another of their terminals.

10. The apparatus of claim 1, wherein the circuit to provide a power or a ground supply is a circuit to provide a ground supply, the circuit further comprising transistors controllable by the control signal, the transistors to receive another ground supply at one of their terminals and to provide the ground supply to the target circuit at another of their terminals, wherein a voltage level of the ground supply to the target circuit is closer to the other ground supply than to the power supply.

11. An apparatus comprising:
   transistors to provide a power supply for a transmitter in response to a first control signal;
   summers to receive input I/O data to be driven by the transmitter, the summers to provide respective summations of a number of 1 s, a number of 0s and a number of transitions of the I/O data; and,
   a finite impulse response (FIR) filter having respective inputs coupled to the summers, the FIR filter to generate the first control signal.

12. The apparatus of claim 11 further comprising a feedback circuit to receive the power supply as its input, the feedback circuit to adjust filter coefficients of the FIR filter according to a voltage level of the power supply.

13. The apparatus of claim 12, wherein the feedback circuit comprises:
   a reference generator; and
   a plurality of comparators each of which are to receive the power supply as their input and a corresponding reference voltage from the reference generator.

14. The apparatus of claim 11 further comprising:
   transistors to provide a ground supply for the transmitter in response to a second control signal;
   second summers to receive the input data to be driver by the transmitter; and
   a second finite impulse response (FIR) filter coupled to the second summers, the FIR filter for generating the second control.

15. The apparatus of claim 14 further comprising a feedback circuit to receive the ground supply as its input and to adjust filter coefficients of the FIR filter according to a voltage level of the ground supply.

16. The apparatus of claim 15, wherein the feedback circuit comprises:
   a reference generator; and
   a plurality of comparators each of which are to receive the ground supply as their input and a corresponding reference voltage from the reference generator.

17. A system, comprising:
   a memory unit;
   a processor coupled to the memory unit, the processor including an apparatus which comprises:
   transistors to provide a power supply for a transmitter in response to a first control signal;
   summers to receive input I/O data that is to be driven by the transmitter, the summers to provide respective summations of a number of 1 s, a number of 0s and a number of transitions of the I/O data; and
   a finite impulse response (FIR) filter having inputs coupled to the summers, the FIR filter to generate the first control signal;
   a feedback circuit to receive the power supply as its input and to adjust filter coefficients of the FIR filter according to a voltage level of the power supply; and
   a wireless interface for allow the processor to communicate with another device.

18. The system of claim 17 further comprising a display unit to display content processed by the processor.

19. The system of claim 18, wherein the display unit is a touch screen.

* * * * *